US008276734B2

United States Patent
Nago et al.

(10) Patent No.: US 8,276,734 B2
(45) Date of Patent: Oct. 2, 2012

(54) BILL VALIDATOR WITH CENTERING DEVICE

(75) Inventors: Tokimi Nago, Sagamihara (JP); Kazuhiko Okamoto, Sagamihara (JP); Toru Seki, Sagamihara (JP)

(73) Assignee: Japan Cash Machine, Co., Ltd., Osaka (JP)

( * ) Notice: Subject to any disclaimer, the term of this patent is extended or adjusted under 35 U.S.C. 154(b) by 1220 days.

(21) Appl. No.: 10/950,251

(22) Filed: Sep. 24, 2004

(65) Prior Publication Data
US 2005/0045449 A1 Mar. 3, 2005

Related U.S. Application Data

(60) Provisional application No. 60/506,700, filed on Sep. 26, 2003.

(51) Int. Cl.
*G07F 7/04* (2006.01)
*G07D 11/00* (2006.01)
(52) U.S. Cl. ........................................ 194/293; 194/344
(58) Field of Classification Search .................. 194/293, 194/206, 207, 302, 344; 271/240; 235/379; 209/534
See application file for complete search history.

(56) References Cited

U.S. PATENT DOCUMENTS

| 5,039,080 | A | * | 8/1991 | Kato et al. | 271/122 |
| 5,368,147 | A | * | 11/1994 | Menke et al. | 194/206 |
| 5,560,187 | A | * | 10/1996 | Nagashima et al. | 53/589 |
| 5,577,589 | A | * | 11/1996 | Garcia Tinoco | 194/204 |
| 5,590,445 | A | * | 1/1997 | Lee | 26/51 |
| 5,730,437 | A | * | 3/1998 | Boyadjian | 270/58.07 |
| 6,158,565 | A | * | 12/2000 | Mikami et al. | 194/206 |
| 6,164,642 | A | * | 12/2000 | Onipchenko et al. | 271/240 |
| 6,547,235 | B2 | * | 4/2003 | Higaki | 271/10.01 |
| 6,554,270 | B2 | * | 4/2003 | Yamamoto | 271/117 |
| 6,789,795 | B2 | * | 9/2004 | Kallin et al. | 271/272 |
| 6,880,707 | B2 | * | 4/2005 | Rosello | 209/534 |
| 7,168,355 | B2 | * | 1/2007 | Bascom et al. | 83/552 |

FOREIGN PATENT DOCUMENTS

| JP | 2000026010 | 1/2000 |
| JP | 2000149089 | 5/2000 |
| JP | 2000187759 | 7/2000 |

* cited by examiner

*Primary Examiner* — Mark Beauchaine
(74) *Attorney, Agent, or Firm* — Bachman & LaPointe, P.C.

(57) ABSTRACT

Centering device 14 of a bill validator comprises a pair of pinch jaws 15 positioned on the opposite sides of a passageway 6, and a centering motor 30 for moving pinch jaws 15 toward and away from each other for reciprocation of pinch jaws 15 so that pinch jaws 15 come into contact with side edges of a bill between pinch jaws 15 to align a central line of bill with a central line of passageway 6. As centering motor 30 stalls when warpage resistance by centered bill is greater than inherent holding torque of centering motor 30, centering device 14 has the simplified structure with reduced number of structural components for light weight and reliable centering operation.

10 Claims, 7 Drawing Sheets

BILL VALIDATOR WITH CENTERING DEVICE

This application claims priority to Provisional Application No. 60/506,700, filed 26 Sep. 2003.

FIELD OF THE INVENTION

This invention relates to a bill validator, in particular, of the type which has a centering device capable of centralizing bills of different widths along a longitudinal central axis of a bill passageway in the validator.

DESCRIPTION OF THE PRIOR ART

When a banknote or bill is inserted into a bill validator, an inlet sensor detects the inserted bill to produce from the inlet sensor a detection signal used to start to activate a conveyer. Then, the bill is moved by the conveyer through a validation sensor mounted in position along a bill passageway so that the validation sensor scans a predetermined position on bill to detect a physical feature such as optical or magnetic feature of the bill. To stably detect any physical feature from bills, the bill is centralized to register a longitudinal central line of the bill with a central line of the passageway so that the validation sensor can always scan a predetermined position of bills of even different sizes.

For example, U.S. Pat. No. 5,368,147 discloses a testing device for banknotes with a centering device which has a pair of channel halves retained in the separated end position by elastic force of a spring in order to perform a centering operation for moving the channel halves toward each other against the elastic force of the spring when a bill is inserted into a passageway of the testing device. Also, Japanese Patent Disclosure No. 2000-149089 shows a bill handling apparatus that has a centering device with a pair of pinch levers whose contact ends are kept in the widened positions by an elastic force of a tensional spring to carry out a centering function of a bill while the contact ends of the pinch levers are moved toward each other by downward movement of a lower convey portion due to its gravity against the elastic force of the tensional spring when a bill is inserted into an inlet.

However, prior art bill validating devices are defective in that the equipped centering device has the very complicated structure with increased number of structural components, and therefore, requires frequent maintenance and inspection of the centering device.

An object of the present invention is to provide a bill validator with a centering device of a simplified structure for positively centralizing bills along a longitudinal central line of a passageway in the bill validator.

SUMMARY OF THE INVENTION

The bill validator with a centering device according to the present invention comprises: a conveyer device (8) for inwardly transporting a bill inserted from an inlet (7) into the validator along a passageway (6); a validation sensor (18 to 20) for converting a physical feature of the bill moved along the passageway (6) into electric signals; a control device (60) for receiving the electric signals from the validation sensor (18 to 20) to discriminate authenticity of the bill and drive the conveyer device (8) in response to the result of the authenticity discrimination; a centering device (14) mounted on the validator (1) ahead of the validation sensor (18 to 20). The centering device (14) comprises a pair of pinch jaws (15) positioned on the opposite sides of the passageway (6), and a centering motor (30) for moving the pinch jaws (15) toward and away from each other for reciprocation of the pinch jaws (15) so that the pinch jaws (15) come into contact with side edges of the bill between the pinch jaws (15) to align a central line of the bill with a central line of the passageway (6). As the centering motor (30) stalls when warpage resistance of the centered bill is greater than inherent holding torque of the centering motor (30), the centering device (14) can have the simplified structure with reduced number of structural components for light weight and reliable centering operation. And then, the conveyer device (8) further inwardly transports the bill along the passageway (6).

In an embodiment of the present invention, the centering motor (30) is a stepping motor which can arrive at a power-swing damping when the warpage resistance of the bill is greater than the inherent holding torque of the centering motor (30), however, it does not necessarily require such a stepping motor, and may be otherwise a servo-motor of another type. The conveyer device (8) comprises belts (9, 11, 12) provided on a lower casing (3), a roller device (10) provided on an upper casing (4), an inlet sensor (16) provided ahead of the belts (9, 11, 12) in electric connection to the control device (60), and a convey motor (61) for driving the belts (9, 11, 12). The centering device (14) comprises a trigger sensor (17) provided in the vicinity of the belts (9, 11, 12) in electric connection to the control device (60). The roller device (10) comprises rollers (40 to 42) in contact to the belts (9, 11, 12). The inlet sensor (16) detects the bill inserted into the inlet (7) to produce a detection signal, and thereby the control device (60) starts driving the belts (9, 11, 12). The trigger sensor (17) detects the bill to produce a detection signal, thereby the bill is released from the engagement with the belts (9, 11, 12) and the centering motor (30) is activated to centralize the bill. The conveyer device (8) comprises a front belt (9) mounted on the lower casing (3), and a pair of side belts (11, 12) in the opposite sides of the front belt (9). The roller device (10) comprises a front roller (40) and a pair of side rollers (41, 42) which respectively are in contact to the front and side belts (9, 11, 12) mounted on the lower casing (3), a holder (43) formed into a U-shape, a first shaft (44) mounted on the holder (43) for supporting the front roller (40), a second shaft (45) rotatably mounted on the holder (43) with end stems extending from the holder (43) for supporting the side rollers (41, 42) thereon, and springs (46) wound around the end stems of the second shaft (45) for applying elastic force on the holder (43) when the holder (43) is rotated around the second shaft (45). The front and side rollers (40, 41, 42) of the roller device (10) are rotated respectively under contact to the front and side belts (9, 11, 12) to inwardly transport the bill inserted from the inlet (7) when the convey motor (61) is rotated in the forward direction. When the convey motor (61) is rotated in the adverse direction, the side rollers (41, 42) are also rotated in the adverse direction together with the shaft (45) under frictional force by the springs (46) which exert elastic force on the holder (43) to rotate and keep the holder (43) in the inclined condition. The centering motor (30) performs the reciprocation of the pinch jaws (15) between the original and nip positions. The distance between the pinch jaws (15) in the original positions is greater than width of the bill. The centering motor (30) is rotated in the forward direction to move the pinch jaws (15) toward the nip positions, and then, rotated in the adverse direction to return the pinch jaws (15) to the original positions. A jaw sensor (63) is provided to detect the pinch jaws (15) in the original positions. The control device (60) determines whether the bill is genuine or counterfeit after the bill has passed the validation sensor (18 to 20). The control device

(60) drives the convey device (8) in the adverse direction to upwardly move the front roller (40) away from the front belt (9) when the control device (60) considers the bill to be counterfeit, and the centering motor (30) is rotated in the adverse direction to return the bill to the inlet (7).

BRIEF DESCRIPTION OF THE DRAWINGS

The above-mentioned and other objects and advantages of the present invention will be apparent from the following description in connection with preferred embodiment shown in the accompanying drawings wherein.

BEST MODE FOR CARRYING OUT THE INVENTION

With reference to FIGS. 1 to 13, an embodiment is described hereinafter of a bill validator with a centering device according to the present invention.

Figure 1:
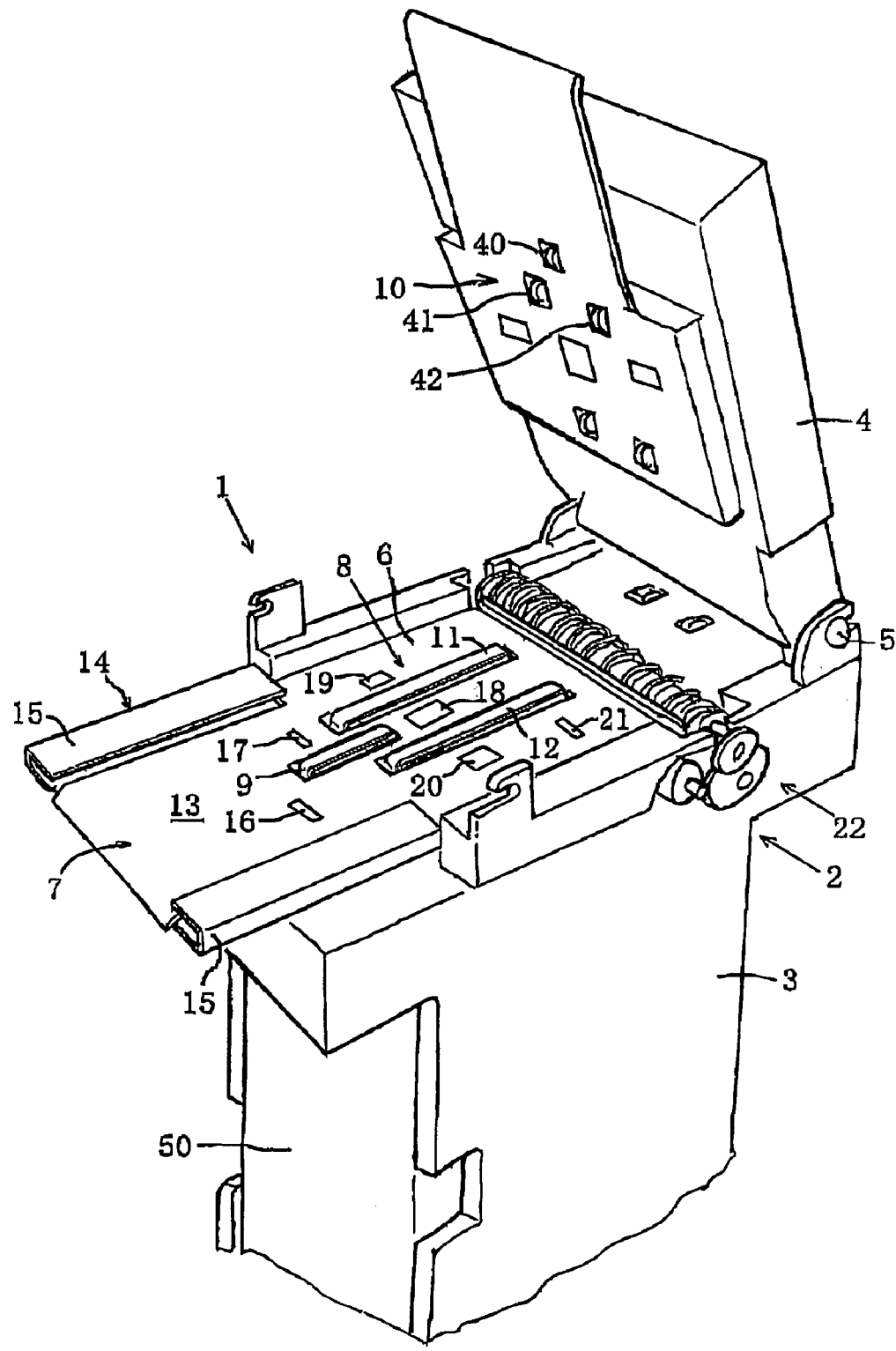
FIG. 1 is a perspective view of a bill validator according to the present invention with an upper casing in the opened condition.
Figure 2:
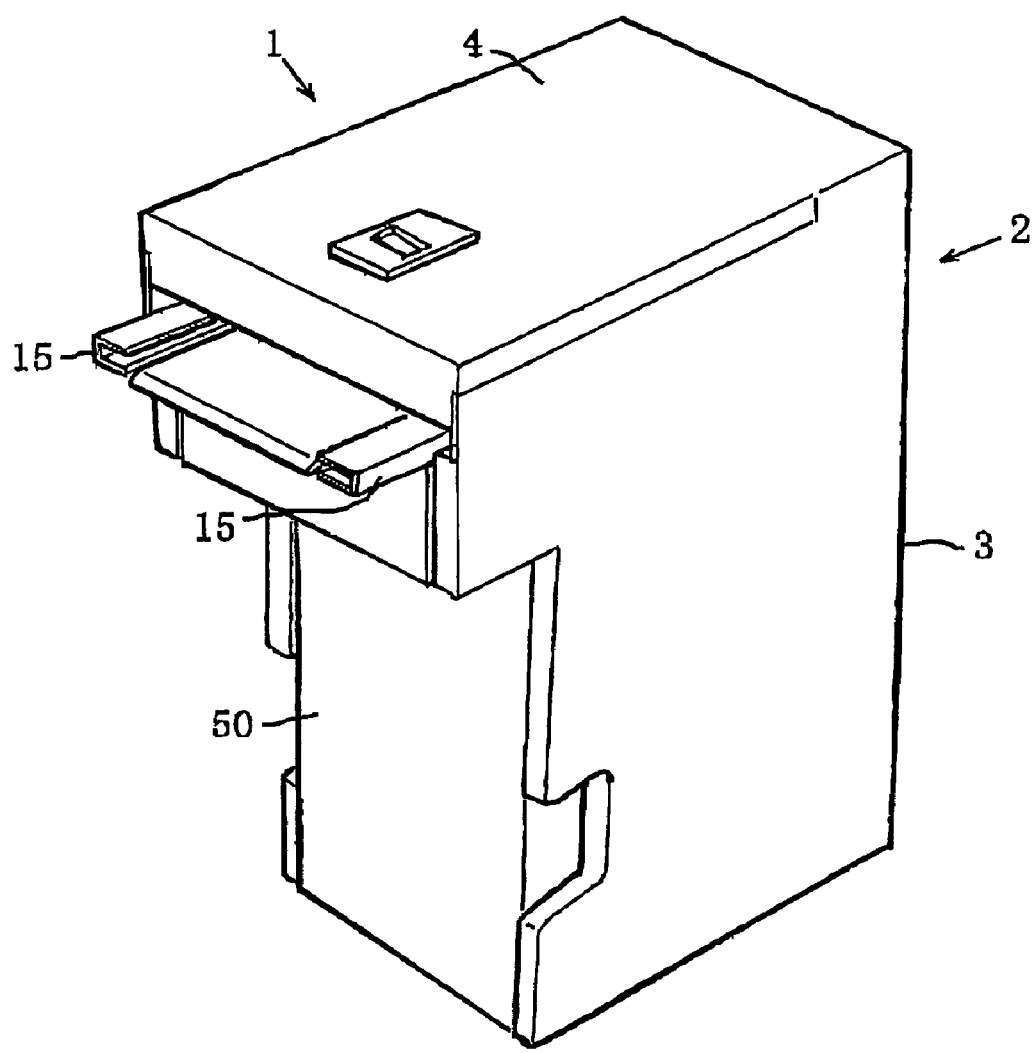
FIG. 2 is a perspective view of the bill validator according to the present invention with the upper casing in the closed condition.

As shown in FIG. 1, the bill validator 1 of the present invention comprises a casing 2 formed of a metallic material such as aluminum which includes a lower casing 3 and an upper casing 4 rotatably mounted on lower casing 3. Specifically, upper casing 4 is rotatably and removably mounted on lower casing 3 by means of a casing shaft 5 to define a passageway 6 between lower and upper casings 3 and 4. Provided in lower casing 3 is a stacker device 50 which receives and stores bills considered to be genuine and moved along passageway 6.

An inlet 7 is formed at a front end of passageway 6 to insert a bill into inlet 7, and a conveyer device 8 is attached in the middle of passageway 6. Conveyer device 8 comprises a front belt 9 supported on lower casing 3, a pair of side belts 11, 12 positioned in the opposite sides of front belt 9, and a roller device 10 mounted on upper casing 4 to inwardly carry a bill inserted from inlet 7 along passageway 6. A centering device 14 comprises a pair of pinch jaws 15 in the opposite sides of a front end of a support plate 13 which provides a bottom for passageway 6.

An inlet sensor 16 of photocoupler is secured on support plate 13 of passageway 6 to detect a leading edge of bill inserted from inlet 7. Inlet sensor 16 is located diagonally in front or ahead of front and side belts 9, 11 and 12 because inlet sensor 16 produces a detection signal to drive conveyer device 8 immediately after inlet sensor 16 detects inserted bill. A trigger sensor 17 is disposed in a side of front belt 9 and ahead of one of side belts 11 and 12 because trigger sensor 17 produces a detection signal to start centering operation of pinch jaws 15 after trigger sensor 17 detects inserted bill. Three validation sensors 18, 19 and 20 are positioned behind front belt 9 and in the sides of side belts 11 and 12 to convert physical features of bill moved along passageway 6 into electric signals. Validation sensor 18 is a magnetic sensor such as a magnetic head for detecting a magnetic pattern printed on bill or a photocoupler for detecting a light reflected on or permeating bill. Other validation sensors 19, 20 on the outer side of side belts 11, 12 are optical sensors such as photocouplers for detecting optical patterns of light reflected on or permeating bill. Provided behind validation sensor 20 is a back sensor 21 such as a photocoupler for detecting passage of bill, and a security means 22 is provided further in the rear of validation sensor 20 to prevent unauthorized draw of bill in stacker device 50.

Figure 3:
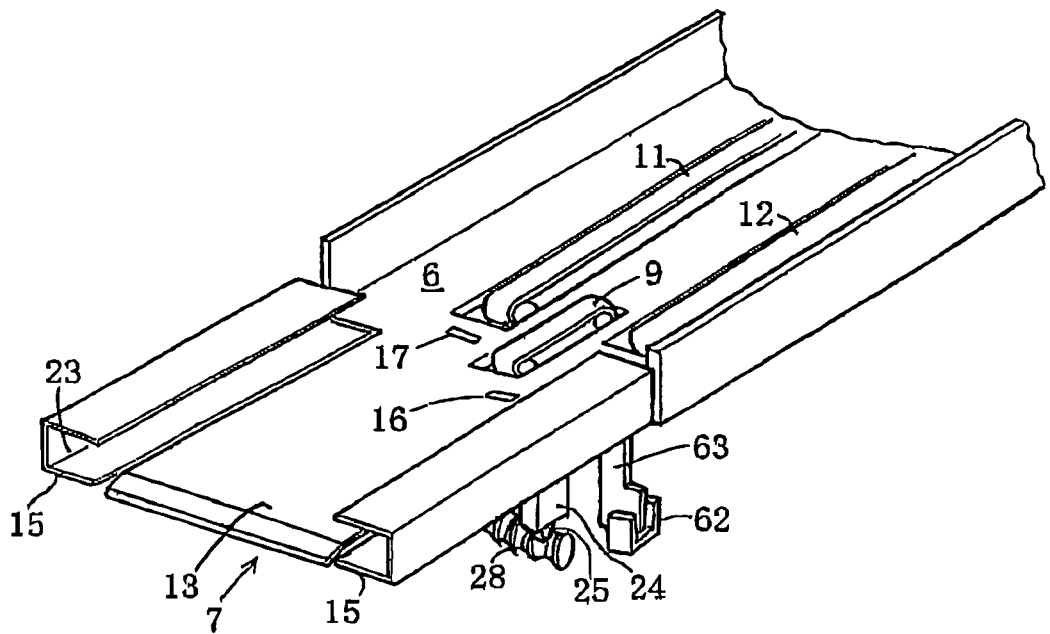
FIG. 3 is a perspective view of a centering device attached to the bill validator shown in FIG. 1.
Figure 4:
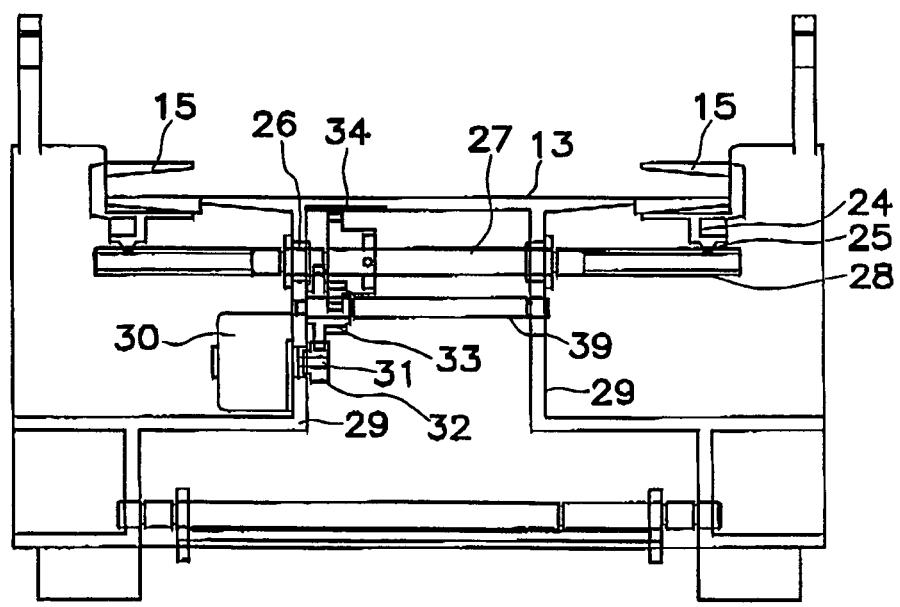
FIG. 4 is a front view shown by a cross section of the centering device.

Centering device 14 is mounted ahead of validation sensors 18, 19, 20 to carry out centering operation for aligning a central line of bill with a central line of passageway 6. Centering device 14 comprises a pair of pinch jaws 15 movable toward and away from each other on the opposite sides of passageway 6, and a centering motor 30 for moving pinch jaws 15 for reciprocation. As illustrated in FIG. 4, each pinch jaw 15 is formed into an overturned channel-shape for defining a groove 23 with a web 24 extending downward from a bottom surface of pinch jaw 15. Support plate 13 has a pair of support walls 29 extending downward from a bottom surface of support plate 13, and each support wall 29 is provided with a bearing 26 for supporting a threaded shaft 27. A pair of screws 28 are formed at both ends of shaft 27 in the opposite threading directions, and a threaded connector 25 formed with each web 24 of pinch jaw 15 is in engagement with screw 28 of shaft 27. When shaft 27 is not rotated, pinch jaws 15 are in the original positions shown in FIG. 10 where pinch jaws 15 are positioned away from each other the longest distance. When shaft 27 is rotated in the forward direction, pinch jaws 15 are moved toward each other from the original positions of FIG. 10 to the nip positions shown in FIG. 11 together with threaded connectors 25 interlocking screws 28. To the contrary, when shaft 27 is rotated in the reverse direction, pinch jaws 15 are outwardly moved away from each other from the nip positions to the original positions. As shown in FIG. 3, one of pinch jaws 15 has an arm 63 downwardly extending, and a jaw sensor 62 is mounted adjacent to a bottom end of arm 63 to detect pinch jaws 15 in the original positions. As two pinch jaws 15 are moved with mirror image or symmetrically around a longitudinal central axis of passageway 6, jaw sensor 62 detects one of pinch jaws 15 in the original position because the other pinch jaws 15 is placed in the symmetrical position with respect to the former pinch jaw 15 around the central axis of passageway 6.

Figure 5:
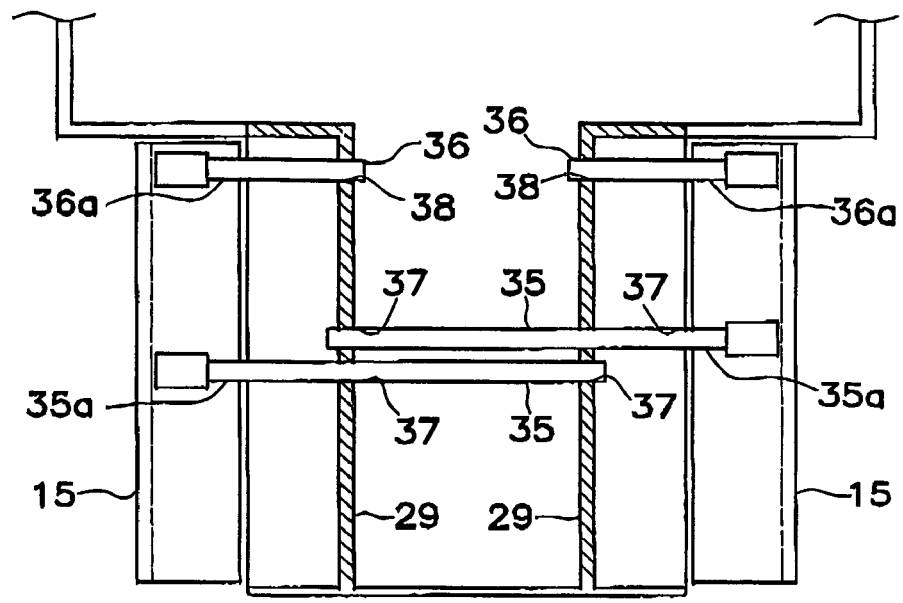
FIG. 5 is a plan view shown by a cross section of the centering device.
Figure 6:
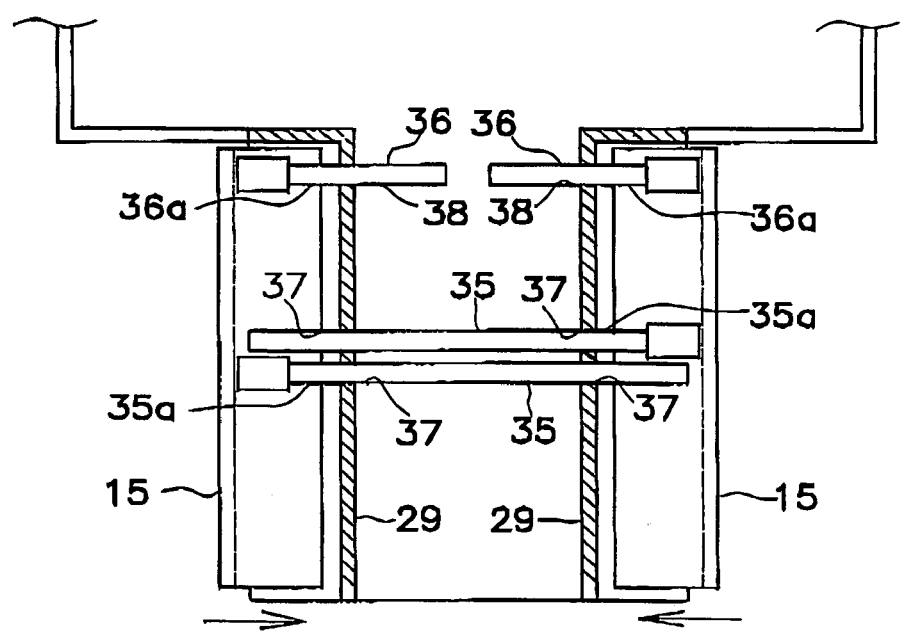
FIG. 6 is a plan view shown by a cross section of the centering device in the nip position.
Figure 7:
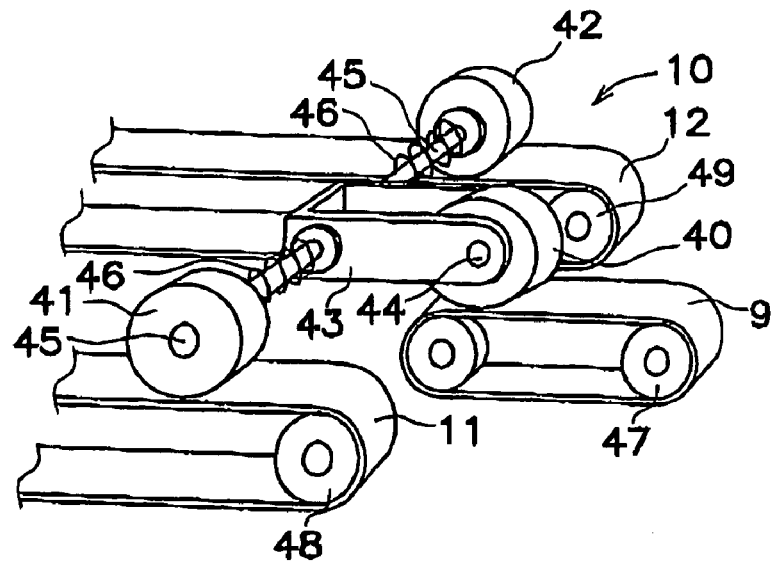
FIG. 7 is a perspective view of a roller device.
Figure 8:
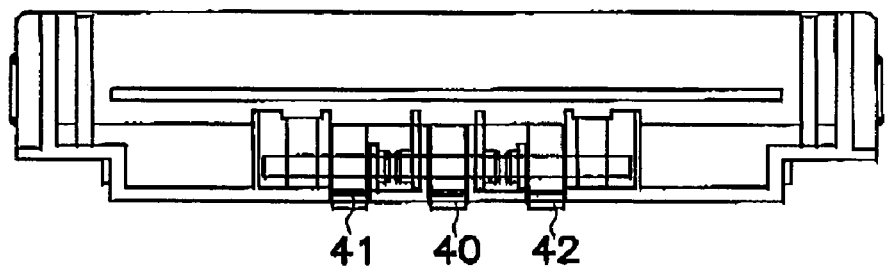
FIG. 8 is a front view of the roller device.
Figure 9:
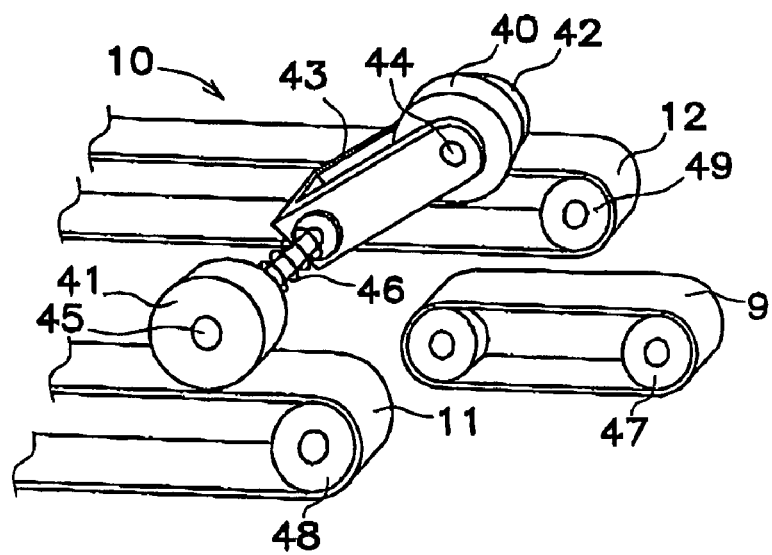
FIG. 9 is a perspective view of the roller device in a convey device driven in the adverse direction.
Figure 10:
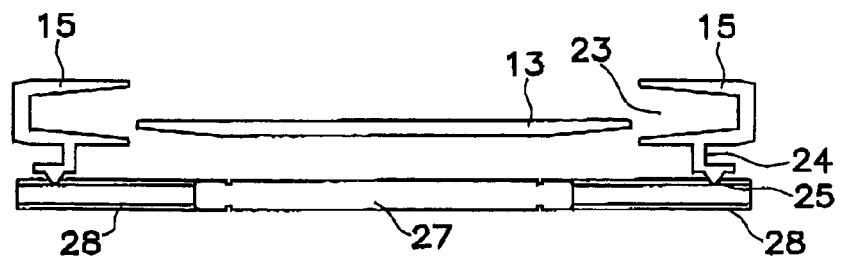
FIG. 10 is an expanded front view of the centering device.
Figure 11:
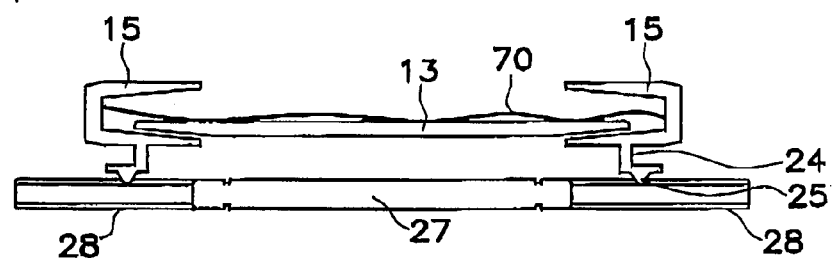
FIG. 11 is a front view of the centering device with a bill received therein.

Mounted on an output shaft 31 of centering motor 32 secured to support wall 29, is a pinion 32 in engagement with intermediate gear 33 which is rotatably attached on a shaft 39 pivotally borne by support wall 29. Intermediate gear 33 is meshed with a final gear 34 secured on shaft 27. As seen in FIG. 5, slidably received in penetration holes 37, 38 formed in support wall 29 are guide rods 35, 36 whose outer ends 35a, 36a are securely attached to bottom surfaces of pinch jaws 15. Therefore, when centering motor 30 is rotated in the forward or reverse direction, pinch jaws 15 are moved toward and away from each other for a predetermined reciprocation under guidance of pinch jaws 15 by guide rods 35, 36. When upper casing 4 shown in FIG. 1 is closed on lower casing 3, roller device 10 in upper casing 4 is in driving connection to convey device 8 in lower casing 3. Roller device 10 comprises, as shown in FIGS. 7 and 8, a front roller 40 in contact to front belt 9 mounted on lower casing 3, a pair of side rollers 41, 42 in contact to side belts 11, 12, a clevis or holder 43 formed into a U-shape, a first shaft 44 fixed on holder 43 for rotatably bearing front roller 40, a second shaft 45 rotatably mounted on holder 43 with end stems extending from holder 43 for supporting side rollers 41 and 42 on the both ends of second shaft 45, and springs 46 wound around end stems of second shaft 45 for exerting elastic force on holder 43 upon rotation of holder 43 around second shaft 45. Front and side belts 9, 11 and 12 are wound around rollers 47, 48 and 49 which are mounted on shafts (not shown) driven by a reversible convey motor 61 (FIG. 12) in convey device 8. When convey motor 61 is driven in the forward direction, front and side rollers 40, 41 and 42 of roller device 10 are rotated under contact to front and side belts 9, 11 and 12 to inwardly convey bill inserted from inlet 7. When convey motor 61 is driven in the adverse direction, side rollers 41 and 42 are also rotated in the reverse direction to turn holder 43 in the reverse direction together with second shaft 45 due to frictional force produced between rollers 41, 42 and holder 43 by springs 46. As a result, holder 43 is rotated around second shaft 45 to cause front roller 40 to upwardly arc around second shaft 45 away from front belt 9, and then a stopper not shown is provided to restrict further rotation of holder 43 and to maintain holder 43 in the inclined position indicated in FIG. 9.

Figure 12:
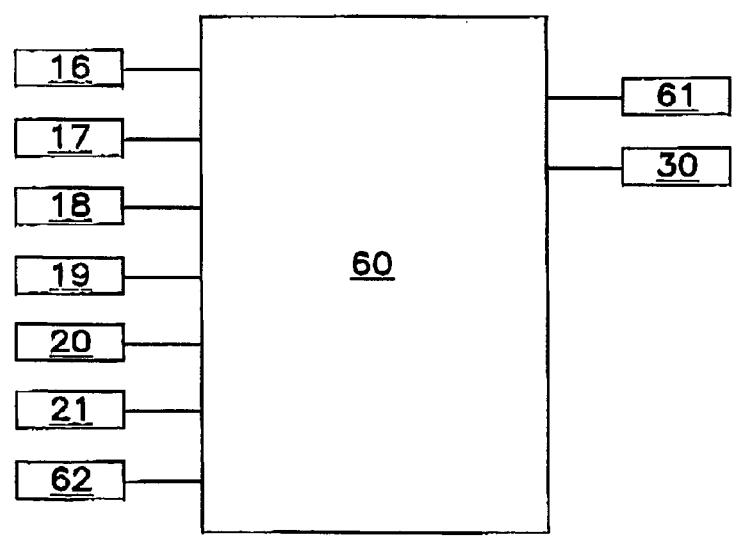
FIG. 12 is a circuit block diagram of electric connections used in the bill validator.
Figure 13:
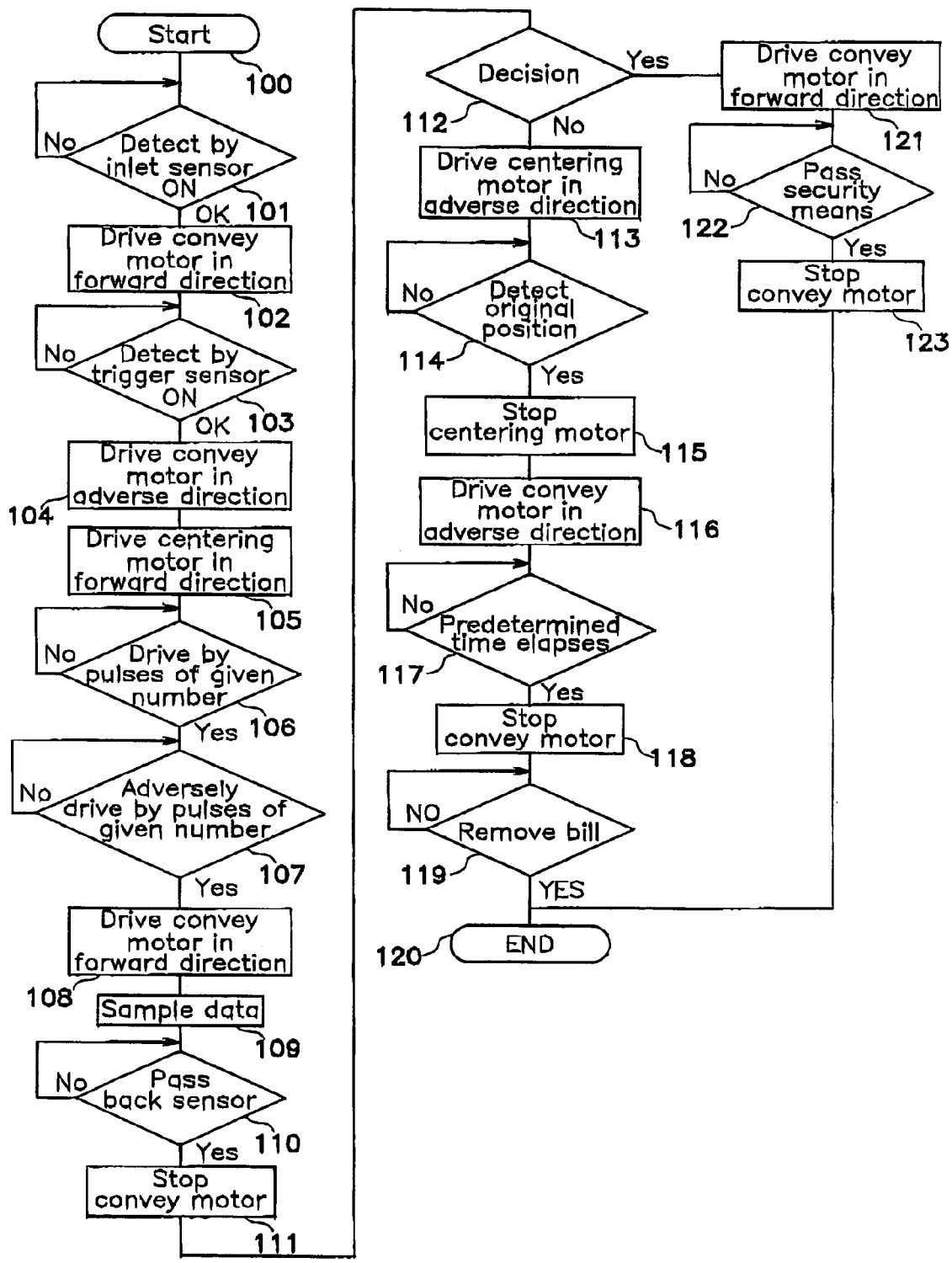
FIG. 13 is a flow chart showing an operational sequence of a control device in the bill validator.

As demonstrated in FIG. 12, a control device 60 includes a microcomputer which has input terminals connected to inlet sensor 16, trigger sensor 17, validation sensors 18, 19, 20 and jaw sensor 62, and output terminals connected to centering motor 30 and convey motor 61. Control device 60 performs the functions for receiving detection signals from inlet and trigger sensors 16 and 17 for coaxial arrangement of bill in passageway 6 when bill is inserted into inlet 7 and detection signals from validation sensors 18, 19, 20 to examine authenticity of bill and drive convey device 8 in consequence thereof. Convey and centering motors 61, 30 are operated according an operational sequence in flow chart shown in FIG. 13.

Processing begins at Step 100 and moves to Step 101 where control device 60 decides whether it receives or not a detection signal from inlet sensor 16. When inlet sensor 16 detects inserted bill, control device 60 receives detection signal from inlet sensor 16 and produces drive signals to rotate convey motor 61 in the forward direction in Step 102 so that front and side belts 9, 11, 12 are driven, and front and side rollers 40, 41, 42 are rotated in the contact condition to front and side belts 9, 11, 12. Accordingly, leading edge of bill is grasped between front belt 9 and front roller 40 to inwardly transport bill along passageway 6. When leading edge of bill reaches trigger sensor 17, control device 60 receives a detection signal from trigger sensor 17 in Step 103, and then, drives convey motor 61 in the adverse direction for a short period of time, for example a second. Front and side belts 9, 11, 12 are therefore rotated in the adverse direction to slightly return leading edge of bill grasped between side belts 11, 12 and side rollers 41, 42 toward inlet 7 while holder 43 is upwardly rotated along an arcuate path and stopped upon contact to stopper as mentioned above to keep holder 43 in the inclined condition. Thus, front roller 40 is retained in the upper position in spaced relation to front belt 9 to place bill between pinch jaws 15 under the released condition from grasp by convey device 8.

Next, as control device 60 generates drive signals to centering motor 30 to rotate it in the forward direction in Step 105, shaft 27 is rotated in the forward direction to inwardly move threaded connections 25 along screws 28. For that reason, pinch jaws 15 are moved toward each other from the original positions of FIG. 10 to the nip positions of FIG. 11 for centering function so that longitudinal central line of bill comes into alignment with longitudinal central line of passageway 6. Upon completion of centering operation, resistance force against bill's warpage or buckling is applied to pinch jaws 15 inwardly pushed. When resistance force by bill is greater than pushing force of pinch jaws 15 derived from centering motor 30, it overcomes pushing force of pinch jaws 15. This means that a mechanical load over a predetermined level or inherent holding torque of centering motor 30 is applied to centering motor 30 which therefore arrives at a power-swing damping or slippage to forcibly hinder further rotation of centering motor 30. Accordingly, centering operation can be accomplished with the simple structure of centering motor 30 without need of additional clutch mechanism.

In Step 106, control device 60 decides whether centering motor 30 is driven with drive pulses of given number for a period of time for example a second. When this has been done, control device 60 activates centering motor 30 in the adverse direction in Step 107 to return pinch jaws 15 from the nip positions of FIG. 11 to the original positions of FIG. 10. Subsequently, control device 60 in Step 108 rotates convey motor 61 in the forward direction, and front roller 40 is downwardly rotated and brought into contact to front belt 9 to further inwardly transport centered bill along passageway 6 by convey device 8. Then, validation sensors 18, 19, 20 convert physical features of bill into electric signals when it passes validation sensors 18, 19, 20 and forward them to control device 60 in Step 109. After that, control device 60 decides passage of rear edge of bill through back sensor 21 when control device 60 receives a detection signal from back sensor 21 in Step 110, and then ceases driving of convey motor 61 in Step 111 to decide authenticity of bill in Step 112. When control device 60 decides that bill is not genuine, processing goes to Step 113 where control device 60 drives centering motor 30 in the reverse direction to positively return pinch jaws 15 to their original positions until jaw sensor 62 detects one of pinch jaws 15 in the original position. When jaw sensor 62 discerns one of returned pinch jaws 15, it produces a detection signal to control device 60 which deactivates centering motor 30 in Step 115. Thereafter, control device 60 rotates convey motor 61 in the adverse direction in Step 116, and decides whether a period of time has elapsed in Step 117. When the time is over, control device 60 stops convey motor 61 and receives from inlet sensor 16 a signal indicative of bill's removal from inlet 7 of validator by a user in Step 119 for the final Step 120 "END".

When control device 60 decides that bill is genuine in Step 112, it drives convey motor 61 in the forward direction in Step 121 to transport bill through back sensor 21 and security means 22 in Step 122 to stacker device 50, and stops convey motor 61 for Step 120.

What is claimed are:

1. A bill validator with a centering device comprising:
    a conveyer device for inwardly transporting a bill inserted from an inlet into the validator along a passageway;
    a validation sensor for converting a physical feature of the bill moved along the passageway into electric signals;
    a control device for receiving the electric signals from the validation sensor to discriminate authenticity of the bill and drive the conveyer device in response to the result of the authenticity discrimination;

said centering device mounted on the validator ahead of the validation sensor, the centering device comprising a pair of pinch jaws positioned on the opposite sides of the passageway, and a centering motor such as a stepping motor for moving the pinch jaws toward and away from each other for reciprocation of the pinch jaws;

wherein the conveyer device comprises belts which have a front belt mounted on a lower casing and a pair of side belts in the opposite sides of the front belt, a roller device provided on an upper casing, an inlet sensor provided ahead of the belts in electric connection to the control device, and a convey motor for driving the belts;

the centering device further comprises a trigger sensor provided in the vicinity of the belts in electric connection to the control device;

the roller device comprises a front roller and a pair of side rollers which respectively are in contact to the front and side belts mounted on the lower casing, a holder formed into a U-shape, a first shaft mounted on the holder for supporting the front roller, a second shaft rotatably mounted on the holder, the second shaft having end stems extending from the holder for supporting the side rollers thereon, and springs wound around the end stems of the second shaft for applying elastic force on the holder when the holder is rotated around the second shaft;

the front and side rollers of the roller device are rotated respectively in contact to the front and side belts to inwardly transport the bill inserted from the inlet when the convey motor is rotated in the forward direction;

the trigger sensor detects the bill to produce a detection signal to the control device which causes the convey motor and side rollers to rotate in the adverse direction so that the bill is returned toward the inlet and at the same time, the holder together with the front roller is rotated around the second shaft away from the front belt under a frictional force applied on the holder by elastic force of the springs to thereby keep the holder in the inclined condition and release the engagement of the bill with the belts;

then, the centering motor is activated to move the pinch jaws toward and away from each other for the centering operation of the bill;

the centering motor can arrive at slippage when warpage resistance of the centered bill is greater than an inherent holding torque of the stepping motor; and the conveyer device further inwardly transports the bill along the passageway after the stepping motor arrives at slippage.

2. The bill validator of claim 1, wherein the centering motor performs the reciprocation of the pinch jaws between original and nip positions, the distance between the pinch jaws in the original position is greater than width of the bill, the centering motor is rotated in the forward direction to move the pinch jaws toward the nip position, and then, rotated in the adverse direction to return the pinch jaws to the original position.

3. The bill validator of claim 1, further comprising a jaw sensor for detecting the pinch jaws in the original position.

4. The bill validator of claim 1, wherein the control device determines whether the bill is genuine or counterfeit after the bill has passed the validation sensor, the control device drives the convey device in the adverse direction to move the front roller away from the front belt when the control device considers the bill to be counterfeit, and the convey motor is rotated in the adverse direction to return the bill to the inlet.

5. The bill validator of claim 1, wherein the stepping motor can arrive at a power-swing damping when the warpage resistance of the bill is greater than the inherent holding torque of the stepping motor.

6. A bill validator with a centering device comprising:

a conveyer device for inwardly transporting a bill inserted from an inlet into the validator along a passageway;

a validation sensor for converting a physical feature of the bill moved along the passageway into electric signals;

a control device for receiving the electric signals from the validation sensor to discriminate authenticity of the bill and drive the conveyer device in response to the result of the authenticity discrimination;

a centering device mounted on the validator ahead of the validation sensor, the centering device comprising a pair of pinch jaws positioned on the opposite sides of the passageway, and a centering motor for moving the pinch jaws toward and away from each other for reciprocation of the pinch jaws to perform a centering operation wherein the pinch jaws come into contact with side edges of the bill between the pinch jaws to align a central line of the bill with a central line of the passageway;

wherein the centering motor is a stepping motor which can arrive at slippage when warpage resistance of the centered bill is greater than inherent holding torque of the centering motor;

wherein the conveyor device further inwardly transports the bill along the passageway after the stepping motor arrives at slippage;

the conveyor device comprises belts, rollers in contact to the belts, and a reversible convey motor for driving the belts;

when the convey motor is driven in the forward direction, the rollers are rotated under contact to the belts to inwardly convey the bill along the passageway; and when the convey motor is driven in the adverse direction, the belts are rotated in the adverse direction to return the bill toward the inlet and at the same time, release the bill from the engagement with the belts and rollers, and to place the bill between pinch jaws under the released condition for the centering operation of the bill, wherein the conveyer device comprises belts provided on a lower casing, rollers provided on an upper casing, and an inlet sensor provided ahead of the belts in electric connection to the control device;

wherein the centering device comprises a trigger sensor provided in the vicinity of the belts in electric connection to the control device;

the inlet sensor detects the bill inserted into the inlet to produce a detection signal, and thereby the control device starts driving the belts;

the trigger sensor detects the bill to produce a detection signal, and thereby the bill is released from the engagement with the belts and the centering motor is activated for the centering operation of the bill, wherein the conveyer device comprises a front belt mounted on the lower casing, and a pair of side belts in the opposite sides of the front belt;

the rollers comprises a front roller and a pair of side rollers which respectively are in contact to the front and side belts mounted on the lower casing, a holder formed into a U-shape, a first shaft mounted on the holder for supporting the front roller, a second shaft rotatably mounted on the holder, the second shaft having end stems extending from the holder for supporting the side rollers thereon, and springs wound around the end stems of the second shaft for applying elastic force on the holder when the holder is rotated around the second shaft;

the front and side rollers are rotated respectively in contact to the front and side belts to inwardly transport the bill inserted from the inlet when the convey motor is rotated in the forward direction;

when the convey motor is rotated in the adverse direction, the side rollers are rotated in the adverse direction together with the second shaft under a frictional force by the springs which exert elastic force on the holder to rotate and keep the holder in an inclined condition.

7. The bill validator of claim 6, wherein the centering motor can arrive at a power-swing damping when the warpage resistance of the bill is greater than the inherent holding torque of the centering motor.

8. The bill validator of claim 6, wherein the centering motor performs the reciprocation of the pinch jaws between original and nip positions, the distance between the pinch jaws in the original position is greater than width of the bill, the centering motor is rotated in the forward direction to move the pinch jaws toward the nip positions, and then, rotated in the adverse direction to return the pinch jaws to the original positions.

9. The bill validator of claim 6, further comprising a jaw sensor for detecting the pinch jaws in the original positions.

10. The bill validator of claim 6, wherein the control device determines whether the bill is genuine or counterfeit after the bill has passed the validation sensor, the control device drives the convey device in the adverse direction to move the front roller away from the front belt when the control device considers the bill to be counterfeit, and the convey motor is rotated in the adverse direction to return the bill to the inlet.

* * * * *